United States Patent [19]
Terrones

[11] 3,769,720
[45] Nov. 6, 1973

[54] EDUCATIONAL TEACHING BOARD IN FOUR FOOD GROUPS

[76] Inventor: Consuelo Terrones, 501 Mission Rd., El Paso, Tex.

[22] Filed: June 1, 1972

[21] Appl. No.: 258,771

[52] U.S. Cl. ................................. 35/7 A, 40/142 A
[51] Int. Cl. ............................................. G09b 1/08
[58] Field of Search .......................... 35/7 A, 69–73; 40/142 A; 273/157

[56] References Cited
UNITED STATES PATENTS

| | | | |
|---|---|---|---|
| 3,681,857 | 8/1972 | Yardley | 35/7 A |
| 3,010,228 | 11/1961 | Torre | 35/7 A |
| 1,624,741 | 4/1927 | Leppke | 35/73 UX |
| 3,389,480 | 6/1968 | Holland | 35/71 X |
| 3,496,653 | 2/1970 | Wolfner et al. | 35/73 |

FOREIGN PATENTS OR APPLICATIONS 1,147,658    6/1957    France .................................. 35/71

Primary Examiner—Harland S. Skogquist
Assistant Examiner—J. H. Wolff

[57] ABSTRACT

An educational device for teaching food nutrition to children, while at the same time providing diversion and play so to hold their attention, the device consisting of a game board upon which different food groups are represented by pictorial designs, the game board surface being of sheet so that playing pieces fitted with magnets will hold to the surface, each playing piece having a shape corresponding to a shape of one of the designs so a child tries to match the correct ones together before applying the piece thereupon.

1 Claim, 1 Drawing Figure

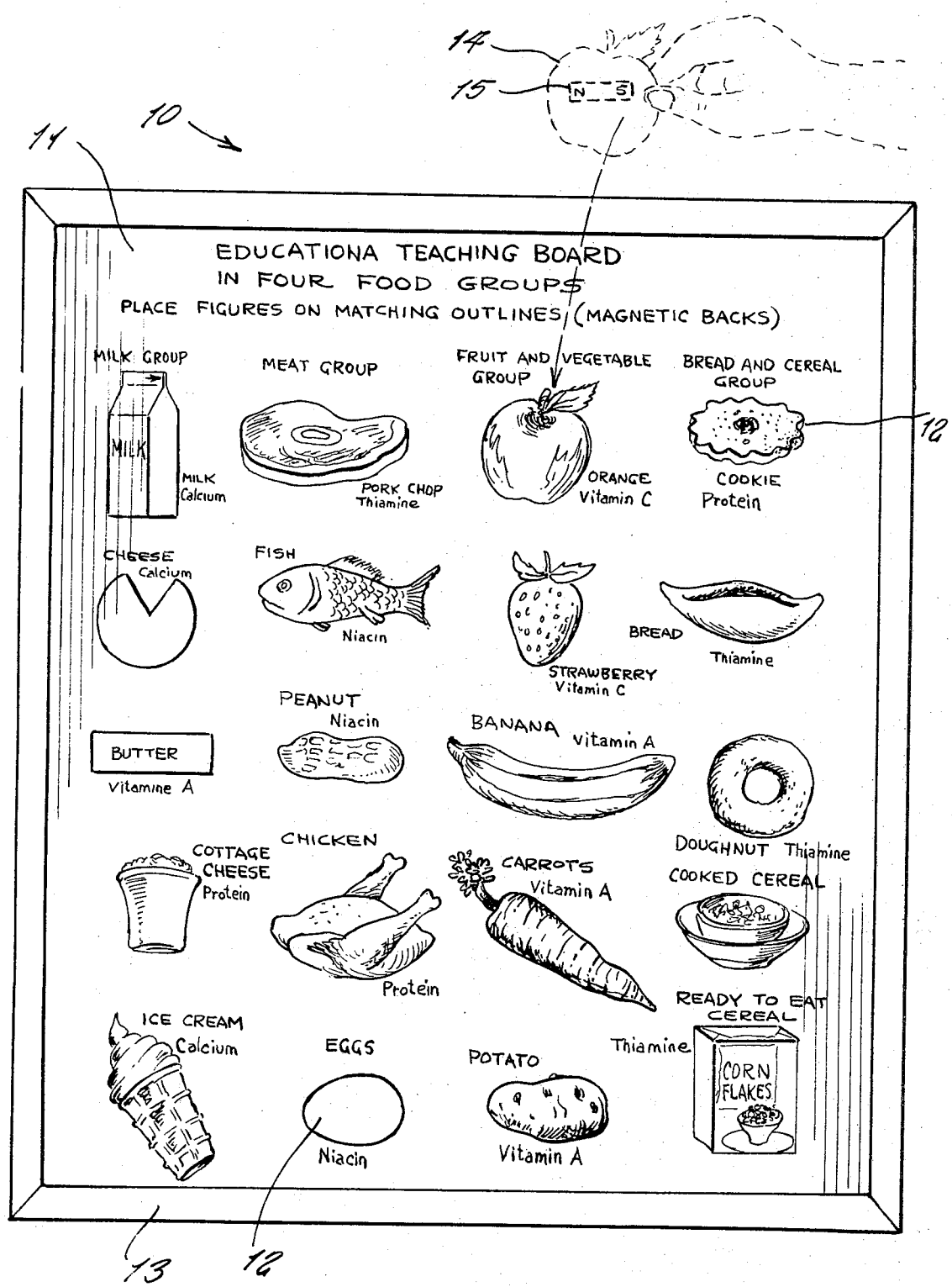

EDUCATIONAL TEACHING BOARD IN FOUR FOOD GROUPS

This invention relates generally to educational devices.

A principal object of the present invention is to provide an educational teaching board so that children can learn basic nutritional food needs.

Another object is to provide an educational teaching board which accordingly will promote an interest in developing good health in children by teaching them the nutritional values of various foods.

Yet another object is to provide an educational teaching board which while serving an educational purpose, provides entertainment and diversion by giving the child a play activity.

Other objects are to provide an educational teaching board which is simple in design, inexpensive to manufacture, rugged in construction, easy to use, and efficient in operation.

These and other objects will be readily apparent upon study of the following specification and the accompanying drawing, wherein:

The sole FIGURE is a plan view of the present invention shown in operative use by a child.

Referring now to the drawing in detail, the reference numeral 10 represents an educational teaching board according to the present invention wherein there is a generally square panel 11 made of sheet steel. A top surface of the panel forms a playing field by having pictorial designs 12 imprinted thereupon, the designs being arranged in vertical and horizontal rows so to represent different food groups.

Thus a vertical row of designs shows a milk group. Other vertical rows show a meat group, a fruit and vegetable group and a bread and cereal group. In each vertical row there are designs of various foods in that particular group. Each design is a picture of the food, and alongside or on each picture there is imprinted the word that identifies the food. Also alongside each picture there is imprinted a term that identifies the food value in vitamins or minerals so that a child will learn which foods are beneficial for these body-building nutritional materials.

The panel 11 is fitted in a wooden or plastic frame 13 for giving a finished appearance.

The present invention includes a series of individual playing pieces 14, each of which has a size and shape that is the same as one of the designs 12. Each of these pieces may be made out of bread dough or the like, and they may then be attractively colored to suit the design. A permanent magnet 15 is fitted in the back of each playing piece so that it will magnetically attract the steel panel 11, thus holding the piece thereto.

In playing, the child will try to associate the correct piece with each design before securing it thereupon. Children are fascinated by the pull of the magnetic attraction while fitting the pieces on the board, thus holding their attention to the educational teaching board.

While various changes may be made in the detail construction, it is understood that such changes will be within the spirit and scope of the present invention as is defined by the appended claims.

I claim:

1. In an educational teaching board the combination of gameboard and a plurality of playing pieces for placement upon said gameboard, and means wherein nutritional values of different foods are taught by said gameboard and playing pieces to children while providing entertainment, said means comprising said gameboard consisting of a sheet steel panel with a playing field on one side imprinted with pictorial designs of various foods, said designs being arranged in rows of different food groups, one row being defined as a milk group, another as a meat group, another as a fruit and vegetable group, and another as a bread and cereal group, each playing piece comprising an individual member shaped and sized to correspond to one of said designs, and a rear side of said memer having a permanent magnet therein so to magnetically hold on said panel of said gameboard.

* * * * *